Dec. 11, 1951     S. M. GRISWOLD ET AL     2,577,749
METHODS OF MAKING INSOLE MATRICES
Filed Dec. 19, 1946     2 SHEETS—SHEET 1
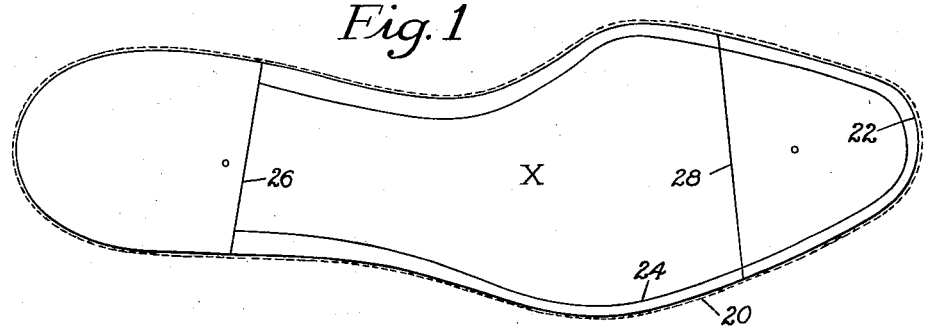
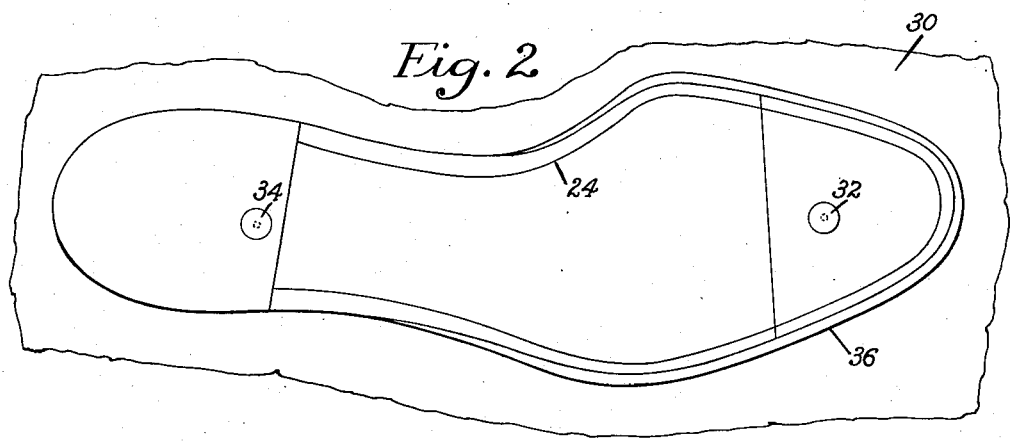
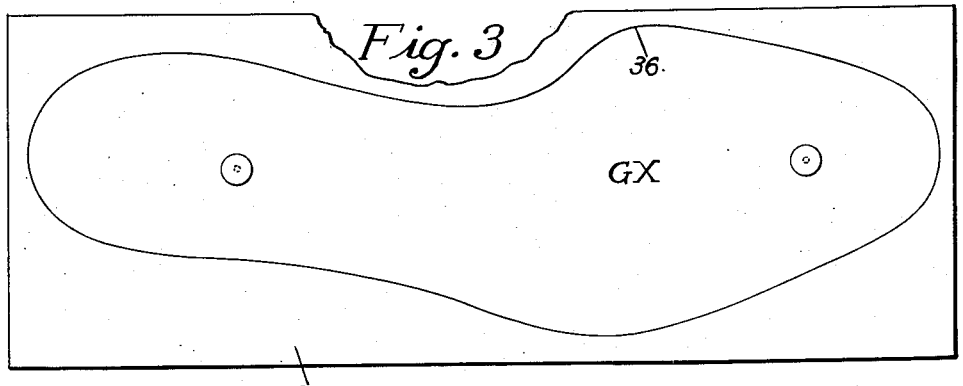
Inventors
Stanley M. Griswold
Hans C. Paulsen
By their Attorney Dec. 11, 1951  S. M. GRISWOLD ET AL  2,577,749
METHODS OF MAKING INSOLE MATRICES
Filed Dec. 19, 1946  2 SHEETS—SHEET 2
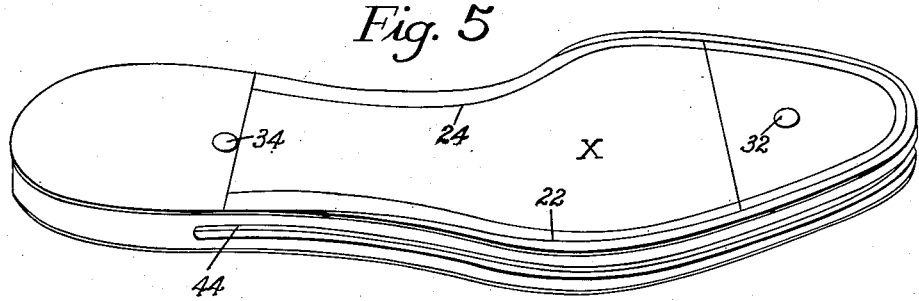
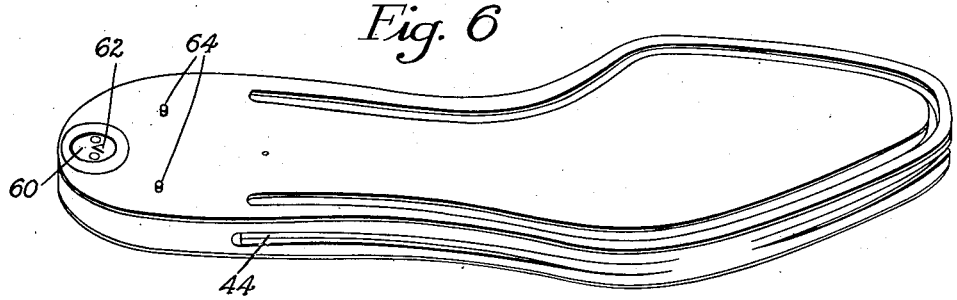
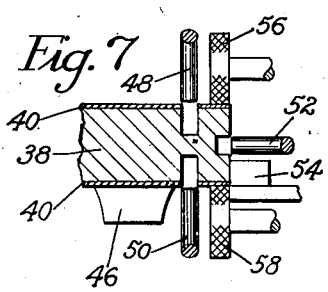
*Inventors*
Stanley M. Griswold
Hans C. Paulsen
By their Attorney Patented Dec. 11, 1951

2,577,749

UNITED STATES PATENT OFFICE 2,577,749

METHODS OF MAKING INSOLE MATRICES

Stanley M. Griswold, Newton, and Hans C. Paulsen, Medford, Mass., assignors to United Shoe Machinery Corporation, Flemington, N. J., a corporation of New Jersey Application December 19, 1946, Serial No. 717,122

6 Claims. (Cl. 144—309)

This invention relates to methods of making matrices for use in making welt insoles.

An object of the invention is to provide methods of making accurate, durable, single-piece matrices for use in producing exactly mated pairs of ribbed insoles. It has heretofore been proposed to provide matrices or molds having therein grooves of the shape and size of an insole rib and to force canvas into such grooves with a corresponding specially sized and shaped patrix. In accordance with the present invention, however, the canvas is progressively and economically formed into a groove of a suitable matrix and thus the cost of equipment for making insoles is greatly reduced and simplified since no patrices are needed.

In making the improved matrix we proceed as follows, although certain variations in the order of steps may be made without departing from the spirit of the invention. A pattern is made of the exact size and shape to cover the bottom of the last on which the insole is to be used when the pattern is conformed to the last bottom. This pattern is reduced uniformly about one thirty-second of an inch all the way around since, in the final operation of trimming the insole to the contour of the pattern, it has been found convenient to allow a one thirty-second inch trimming margin. A line is drawn on the pattern showing the desired location of the outer face of the rib, thus defining the width of the feather, the distance being suitably varied according to the requirements of the particular shoe. This distance, however, will usually be greatest in the shank portion, will be less about the toe forward of the tip line and will be least along the ball portion. The location of the breast line and tip line are preferably indicated on the pattern. In laying out the rib line the various distances are reduced one thirty-second of an inch since the pattern has already been correspondingly reduced.

Another pattern is made from the first which is the same as the first except that its edge, where the rib occurs, is at a uniform distance from the rib line, as indicated on the first pattern, equal to the greatest distance of that line from the edge of the first pattern. These two patterns are then graded up and down on a grading machine to provide a pair of patterns for use in making a matrix for each size and width of insole to be produced.

The second or larger pattern is pinned to a block of wood of suitable size, the block being preferably faced on each side with sheet metal, for example aluminum alloy, for the sake of durability of the matrix. The block may be of any other suitable material, examples of which will be given later. The outline of the second pattern is scribed on the block, the location of the breast line and tip line indicated and the pattern removed. The block is then sawed just outside of the scribed line and dressed down to that line, thus forming a block having the size and shape of the second pattern. Grooves are routed in each face of the block at a uniform distance from its edge equal to the greatest distance of the rib line from the edge of the original pattern, the depth and width of the groove corresponding respectively to the height and thickness desired in the rib.

Preferably the grooves in the two faces of the block are formed progressively and simultaneously starting at the breast line on each side, extending along the shank and forepart and stopping at the breast line on the other side. It is convenient also to form at the same time a groove of less depth in the center of the edge face of the block, this groove being utilized in locating the block with respect to means for tucking the canvas into the groove.

The first pattern is now laid on the block in the same position as the second pattern by which the block was cut out. The block is then dressed down to the line of the first pattern. If desired, of course, the block may be scribed on the outline of the first pattern and then reduced to that line after the grooves are formed.

In forming the grooves, however, it is important to have the matrix so shaped that its edge face is at a uniform distance from the line where the grooves are to be located so that the edge face can be used as a reliable guide in forming the grooves; that is, to shift the location of the grooves with respect to the edge face during the formation of the grooves would require great skill, and a proper standard of accuracy would be difficult or impossible to maintain.

The matrix is completed by providing pins in the heel-seat portion of the insole matrix to prevent shifting of the insole on the matrix when being trimmed and by providing an upstanding tang at the heel end of the matrix to assist in properly placing the canvas upon it.

In the drawings,

Fig. 1 represents the first pattern;

Fig. 2 illustrates the method of forming the second pattern;

Fig. 3 represents the second pattern applied to a block from which the matrix is to be made;

Fig. 4 is a perspective view of the block after it has been cut out in accordance with the second pattern and grooves formed therein;

Fig. 5 is a perspective view of the block of Fig. 4 with the first pattern applied thereon;

Fig. 6 is a perspective view of the block after it has been reduced to the size and shape of the first pattern and provided with insole-holding pins and a canvas-holding tang to complete the matrix; and Fig. 7 is a diagrammatic view of a machine for grooving the block.

In making the novel matrix, a pattern of the last bottom is obtained on which the locations of the breast line and tip line are indicated. This pattern is indicated by the dotted line 20 in Fig. 1. This pattern is reduced $\frac{1}{32}$ of an inch all the way around for the reason that in the method of making insoles by use of the matrix this $\frac{1}{32}$ of an inch is restored to the insole in the final trimming operation. The pattern, after reduction, is indicated by the full line 22. The location of the rib on the insole varies with the style of the last and the desires of the manufacturer. As a given instance, for illustration only, the outer wall of the rib may be 4½ sixteenths of an inch from the edge of the insole at the breast line and throughout part of the shank, may be 2½ sixteenths of an inch from the edge of the ball region, and may be $\frac{5}{16}$ of an inch from the edge forward of the tip line. Reduced to thirty-seconds of an inch, these measurements become respectively $\frac{9}{32}''$, $\frac{5}{32}''$ and $\frac{9}{32}''$. Now since $\frac{1}{32}''$ has been removed from the pattern these fractions must be reduced by $\frac{1}{32}''$ to represent the proper distance of the rib from the edge of the pattern, as indicated by the line 22. A rib line 24 is now laid out on the pattern, the line being $\frac{8}{32}''$ or $\frac{1}{4}''$ from the line 22 at the breast line 26, $\frac{4}{32}''$ or $\frac{1}{8}''$ from the line 22 at the ball portion and $\frac{5}{32}''$ from the line 22 forward of the tip line 28 and having a gradual and smooth transition from one distance to the others. Of course the distances given are purely illustrative and may be varied according to the requirements of the particular last, the particular shoe to be made or the particular manufacturer to be satisfied. This completed pattern, which will be referred to as pattern X, is laid upon a piece of pattern paper 30 on a drawing board and pinned thereto by at least two pins 32, 34 (Fig. 2). Then a line 36 is drawn on the pattern paper which is at a distance from the line 24 equal to the greatest distance of the rib line 24 from the edge 22 of pattern X, in this case one quarter of an inch. The line 36 is extended around the heel end of the pattern X and a second pattern, referred to herein as GX, is cut out on line 36. The patterns X and GX are graded up or down on a pattern grading machine to provide a pair of patterns for each size and width of insole for which the matrices are to be provided.

Any suitable material may be used for the matrix such as hard wood, hard rubber, formica (fabric impregnated with phenolic condensation product) or solid aluminum.

A block 38 from which a matrix is to be made may, as an economical example, be of wood about five eighths of an inch thick, said block having parallel opposite faces and being somewhat larger than the pattern. Each of the parallel faces of the block may have a layer of sheet metal 40 such as aluminum alloy cemented thereto, the metal having a thickness of about .030 inch. The metal enhances the durability of the resulting matrix. The GX pattern is applied to the block 38 (Fig. 3) and located by pins in the pinholes 32, 34 previously used, holes being drilled in the block for the pins. The outline of the pattern GX is transferred to the block 40 by a sharp pointed scriber and the pattern removed. The block is then sawed just outside of the scribed line, a power band hacksaw being conveniently used. The edge of the block is dressed down to the scribed line on a sander.

The block 38 (Fig. 4) is now ready to receive a rib-forming groove 42 in each of its parallel faces and preferably also a groove 44 in its edge face, all the grooves extending along the shank and forepart from one end of the breast line to the other. The grooves of course may be made in any convenient manner. However, for convenience a routing machine organized as indicated diagrammativally in Fig. 7 may be employed, the machine comprising a support 46 to receive the blank, an upper-routing tool 48 to groove the upper face of the blank, a lower routing tool 50 to groove the lower face of the blank, an edge-routing tool 52 to groove the edge face of the blank, an edge gage 54 to determine the distance of the tools 48, 50 from the edge of the blank (in the present instance ¼"), and preferably feed wheels 56, 58 to advance the blank for the action of the routing tools.

After routing, the blank appears on each of its parallel faces as shown in Fig. 4. The pattern X is now located on the block (Fig. 5) by the same pinholes 32, 34 previously used and the blank dressed down, for example on a sander, to the size of pattern X. Of course, if desired, one may scribe the blank around the edge of pattern X before sanding, remove the pattern and then reduce the blank to the scribed line. The size of the routing tools is, of course, optional, depending upon the thickness of the rib desired (⅛" for example). So also is the depth of the groove formed by the tools 48, 50 which determine the height of the rib, $\frac{3}{16}''$ being usual. The bottom of the edge face groove 44 is at a predetermined uniform distance from the grooves 42 and therefore serves as a guiding surface for locating the matrix with respect to a tool by which canvas is tucked into the groove. The dressing down of the blank to the size of the pattern X is facilitated by the presence of the groove in the edge face of the blank formed by the tool 52, the amount of material to be removed being thus reduced. The depth of this groove is such that it may be entirely removed at the ball portion of the blank and only a vestige of it left about the toe. The guiding surface at the bottom of the groove, however, is not disturbed. The groove at the heel breast will remain of its original depth and the end of the groove which is at the breast line is utilized as a stop or abutment to locate the matrix for the beginning of the operation of tucking canvas into the groove to form a rib. The matrix may, as indicated in Fig. 6, have on each side a plate 60 with an upstanding tang 62 inserted at the heel end to assist in locating the canvas on the matrix and may have pins 64 inserted in the heel portion to prevent lateral shifting of the insole at those portions of the matrix where there is no rib to hold it in place. If desired, the canvas may extend only slightly beyond the breast line, in which case the tang 62 will be located about at the breast line.

The reason for making the block from the second pattern and then cutting it down to the shape of the first pattern after the grooves have been formed in its opposite faces is that it is easier to form the groove at a uniform distance from the edge of the block by using the edge of the block as a guide for the routing tool than it would be to form the groove at a non-uniform distance from an edge where the edge cannot be used as a guide for the tool if the block were first cut to the shape of the original pattern.

The matrix is used for making ribbed insoles by progressively forcing a fold of canvas and a core into the grooves in each face of the matrix throughout their extent, cementing body portions to the canvas on each side of the matrix and trimming the body portions and canvas 1/32 of an inch from the edge face of the matrix.

The method of making insoles by means of the herein-described matrix is disclosed and claimed in United States Letters Patent No. 2,538,776, granted January 23, 1951, in the name of Stanley M. Griswold, and the matrix herein disclosed but not claimed is being disclosed and claimed in an application for Letters Patent of the United States Serial No. 30,078, filed May 29, 1948, in our names.

Having thus described our invention, what we claim as new and desire to secure by Letters Patent of the United States is:

1. That improvement in methods of making welt-insole matrices which comprises providing a first pattern having a line indicating the width of the feather and a block larger than the pattern, making from the first pattern a second pattern like the first pattern except that its edge is at a uniform distance from the rib location line on the first pattern equal to the greatest width of the feather, cutting the block to correspond to the size and shape of the second pattern, forming in the block a groove which is located at a uniform distance from its edge, and reducing the block to the size and shape of the first pattern.

2. Method according to claim 1 in which both sides of the block are grooved at the same time.

3. Method according to claim 1 in which both sides of the block are grooved at the same time and a groove formed in the edge face of the block, all three grooves starting at one end of the breast line and extending around the shank and forepart of the block to the opposite end of the breast line.

4. That improvement in making insole matrices which comprises providing a first insole pattern marked with the rib location and a block larger than the insole pattern, making from the insole pattern a second pattern having a uniform marginal extension beyond the rib location, cutting the block to correspond with the shape of the second pattern, routing a groove in the block at a predetermined uniform distance from its edge equal to the greatest distance of the rib from the edge of the first pattern, and reducing the size of the block to correspond substantially to the size and shape of the first pattern.

5. That improvement in methods of making matrices for welt insoles which consists in providing a block at least as large as the insole having parallel faces, providing a pattern corresponding to the size of the last bottom, marking on said pattern a line indicating the width of the feather of the insole, making from said pattern a second pattern the edge of which is at a uniform distance from the inner edge of the feather of the first pattern, reducing the block to correspond to the second pattern, simultaneously forming in each of the parallel faces of the block rib grooves at a uniform distance from its edge equal to the greatest distance of the feather line from the edge of the first pattern, and reducing the block to the size of the first pattern.

6. Method according to claim 5 in which a groove is formed in the edge face of the block the bottom of which is at a predetermined uniform distance from the rib grooves, said edge groove being formed simultaneously with the rib grooves.

STANLEY M. GRISWOLD.
HANS C. PAULSEN.

REFERENCES CITED

The following references are of record in the file of this patent:

UNITED STATES PATENTS

| Number | Name | Date |
| --- | --- | --- |
| 563,082 | Sleeper | June 30, 1896 |
| 993,405 | Prindle | May 30, 1911 |
| 1,104,743 | Ballard | July 21, 1914 |
| 1,173,449 | Mansbach | Feb. 29, 1916 |
| 1,495,523 | McLean | May 27, 1924 |
| 1,610,450 | Julian | Dec. 14, 1926 |
| 2,117,374 | Stacey | May 17, 1938 |
| 2,238,304 | Belanger | Apr. 15, 1941 |
| 2,498,275 | Johnson | Feb. 21, 1950 |